(No Model.)
S. P. HEDGES.
STEAM BOILER.
No. 301,590. Patented July 8, 1884.
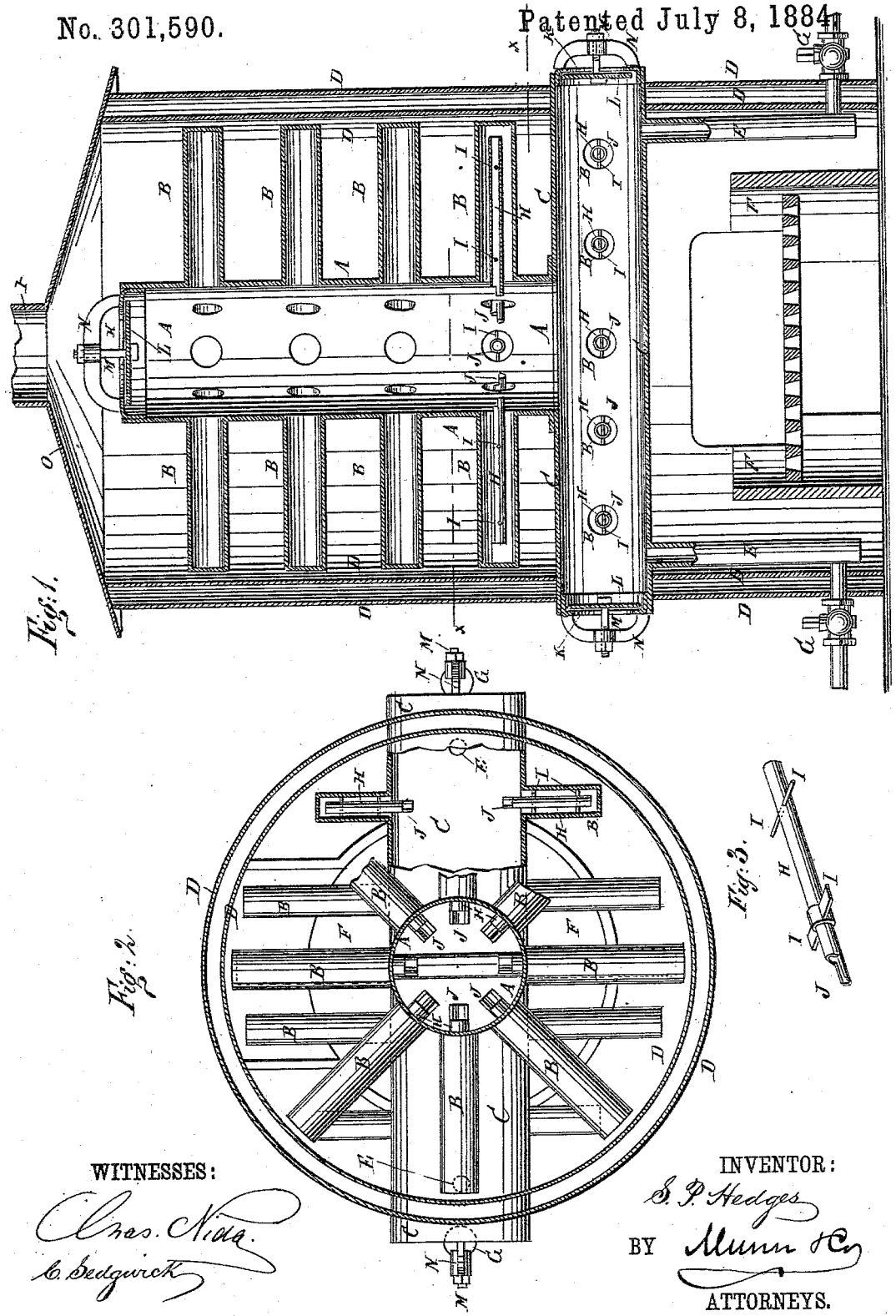
WITNESSES:
INVENTOR:
S. P. Hedges
BY Munn & Co
ATTORNEYS.

UNITED STATES PATENT OFFICE.

SAMUEL P. HEDGES, OF GREENPORT, NEW YORK.

STEAM-BOILER.

SPECIFICATION forming part of Letters Patent No. 301,590, dated July 8, 1884.

Application filed April 16, 1884. (No model.)

*To all whom it may concern:*

Be it known that I, SAMUEL P. HEDGES, of Greenport, in the county of Suffolk and State of New York, have invented certain new and useful Improvements in Steam - Boilers, of which the following is a full, clear, and exact description.

Reference is to be had to the accompanying drawings, forming part of this specification, in which similar letters of reference indicate corresponding parts in all the figures.

Figure 1 is a sectional side elevation of my improved boiler. Fig. 2 is a sectional plan view of the same, taken through the line $x\ x$, Fig. 1. Fig. 3 is a perspective view of the circulation-pipes.

The object of this invention is to provide safety steam-boilers constructed in such a manner that they will generate steam quickly and will be conveniently accessible in all their parts.

The invention consists in a steam-boiler constructed with vertical and horizontal cylinders provided with inlet and blow-off pipes, and with projecting pipes having interior circulation-pipes, whereby steam will be generated quickly. The inner ends of the circulation-pipes project into the interior of the cylinder, and have cups or spouts at their inner ends, whereby a part of the descending current of water will be conducted into the outer parts of the projecting pipes to maintain a circulation. The circulation-pipes are centered and supported in the projecting pipes by cross-pins attached to them, and which rest against the inner surface of the said projecting pipes. With the horizontal cylinder are connected feed and blow-off base-pipes arranged upon the opposite sides of the fire-box, whereby the feed-water will be warmed before entering the cylinder and the sediment can be readily removed, as will be hereinafter fully described.

A is an upright hollow cylinder, which is provided with a number of projecting pipes, B. The outer ends of the pipes B are closed, and their inner ends are screwed or expanded into holes in the cylinder A. With the lower end of the vertical cylinder A is connected a horizontal cylinder or pipe, C, either directly, as shown in the drawings, or by means of T or elbow connections or other suitable means.

The end parts of the pipe or cylinder C extend out through the furnace wall or casing D and rest upon the said wall or casing, or upon saddles connected therewith. From the lower sides of the end parts of the pipe or cylinder C pipes E extend down at the opposite sides of the fire-box F, and are provided with valve-couplings G, with one of which the feed-pipe can be connected, and the other will serve as a blow-off for the removal of sediment.

The wall or casing D can be made of two iron shells placed at a little distance apart, as shown in Figs. 1 and 2, or of brick-work, as may be desired or convenient.

Within the projecting pipes B are placed smaller pipes, H, open at both ends and longer than the said pipes B, so that when the outer ends of the said pipes H are near the outer ends of the said pipes B their inner ends will project so far into the cylinder A as to be beyond the current of hot water and steam ascending along the inner surface of the said cylinder A. The pipes H are centered and supported in the pipes B by pins I, projecting from their opposite sides and resting against the inner surfaces of the said pipes B. The pins I may be short rods passed through holes drilled in the pipes H, as indicated at the right-hand end of Fig. 3, or may be connected with the said pipes H by bands or collars, as shown at the left-hand end of Fig. 3. The upper parts of the inwardly-projecting ends of the pipes H are cut away, as shown in Figs. 1, 2, and 3, forming cups or spouts J to receive the water descending through the middle part of the cylinder A, and cause it to flow through the said pipe H into the inner ends of the pipes B and pass out through the said pipes B.

The opposite sides of the horizontal cylinder C can be provided with projecting pipes B, having interior circulation-pipes, H I J, in the same manner as the upright cylinder A.

In the upper end of the cylinder A, and in the ends of the cylinder C, are formed manholes K, closed by plates L, held in place by bolts M and bridges N in the ordinary manner, to give access to the interior of the cylinders A C, for convenience in cleaning the said cylinders and the pipes B.

The upper part of the cylinder A and the upper tier of pipes B can serve as a steamspace or superheater, and with the said upper part of the cylinder is designed to be connected a steam-pipe, which is not shown in the drawings.

With the cover O of the casing D is connected a flue, P, through which the products of combustion escape.

With this construction the entire outer surface of the cylinders A C and of the projecting pipes B will be exposed to the products of combustion. The heated water and the generated steam will pass out of the pipes B, will pass up along the inner surface of the cylinder A, and will pass down through the middle part of the said cylinder A, a part of the descending current being intercepted by the spouts J and made to pass into the pipes B through the pipes H, so that a thorough and continuous circulation will be established. By this construction, also, a very large heating-surface will be exposed directly to the products of combustion, and consequently steam will be generated quickly.

Having thus fully described my invention, I claim as new and desire to secure by Letters Patent—

1. The combination, in a steam-boiler, of the transverse cylinder C, extending directly through furnace over the fire-box, and radial pipes B, projecting therefrom, and provided with circulation-pipes, with the inlet and blow-off pipes E, passing from the outside of the furnace to the inside on opposite sides of the fire-box, and extending upward to the cylinder C, substantially as set forth.

2. In a steam-boiler, the combination, with the cylinder A and the radial pipes B, of the interior circulation-pipes, H, having cups or spouts J, extending within the said cylinder at their inwardly-projecting ends, substantially as herein shown and described, whereby a part of the descending current of water will be conducted into the outer parts of the projecting pipes to maintain a circulation, as set forth.

3. The combination, with the cylinder C, extending transversely across the furnace over the fire-pot, and provided with inlet and blow-off pipes at its opposite ends, and the central vertical cylinder, A, of the pipes B, projecting from the sides of said cylinders, and the circulating-pipes H, within said pipes B, substantially as set forth.

SAMUEL P. HEDGES.

Witnesses:
JOHN A. SISSON,
EDWIN S. HAVEN.